US012109529B2

(12) United States Patent
Hirata et al.

(10) Patent No.: US 12,109,529 B2
(45) Date of Patent: Oct. 8, 2024

(54) AIR POLLUTION CONTROL UNIT AND AIR POLLUTION CONTROL METHOD, AND CO2 RECOVERY UNIT AND CO2 RECOVERY METHOD

(71) Applicant: MITSUBISHI HEAVY INDUSTRIES, LTD., Tokyo (JP)

(72) Inventors: Takuya Hirata, Tokyo (JP); Hiroshi Tanaka, Tokyo (JP); Masayuki Inui, Tokyo (JP); Shinya Kishimoto, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 506 days.

(21) Appl. No.: 16/635,302

(22) PCT Filed: Oct. 24, 2018

(86) PCT No.: PCT/JP2018/039526
§ 371 (c)(1),
(2) Date: Jan. 30, 2020

(87) PCT Pub. No.: WO2019/087901
PCT Pub. Date: May 9, 2019

(65) Prior Publication Data
US 2020/0368682 A1    Nov. 26, 2020

(30) Foreign Application Priority Data
Oct. 31, 2017    (JP) .................................. 2017-210570

(51) Int. Cl.
*B01D 53/78*    (2006.01)
*B01D 47/06*    (2006.01)
(Continued)

(52) U.S. Cl.
CPC ............. *B01D 53/78* (2013.01); *B01D 47/06* (2013.01); *B01D 53/507* (2013.01); *B01D 53/62* (2013.01);
(Continued)

(58) Field of Classification Search
CPC ...... B01D 53/78; B01D 47/06; B01D 53/507; B01D 53/62; B01D 53/96; B01D 2247/08;
(Continued)

(56) References Cited

U.S. PATENT DOCUMENTS 3,203,156 A * 8/1965 McGregor .............. C09C 1/487
96/321
3,369,344 A * 2/1968 Jackson .................... C11B 3/14
95/201
(Continued)

FOREIGN PATENT DOCUMENTS

EP    0671199 A2    9/1995
EP    3266514 A1    1/2018
(Continued)

OTHER PUBLICATIONS

Written Opinion of the International Search Report issued in corresponding International Application No. PCT/JP2018/039526, mailed Jan. 29, 2019 (13 pages).
(Continued)

*Primary Examiner* — Stephen Hobson
(74) *Attorney, Agent, or Firm* — Osha Bergman Watanabe & Burton LLP (57) ABSTRACT

An air pollution control unit is configured to bring particle-containing gas and washing liquid into contact with each other to collect particles in the particle-containing gas. The air pollution control unit includes a gas washing column having a gas cleaning section in which the particle-contain-
(Continued)

ing gas and the washing liquid are brought into co-current contact with each other, a gas cooling column disposed downstream of the gas washing column along the gas flow and having a gas cooling section in which the particle-containing gas that has been cleaned (cleaned gas) and cooling liquid are brought into countercurrent contact with each other, and a gas communication path.

5 Claims, 5 Drawing Sheets

(51) Int. Cl.
    *B01D 53/50*     (2006.01)
    *B01D 53/62*     (2006.01)
    *B01D 53/96*     (2006.01)

(52) U.S. Cl.
    CPC .......... *B01D 53/96* (2013.01); *B01D 2247/08* (2013.01); *B01D 2247/106* (2013.01)

(58) Field of Classification Search
    CPC .. B01D 2247/106; B01D 47/02; B01D 50/40; B01D 45/06; B01D 53/50; Y02C 20/40; C01B 32/50
    See application file for complete search history.

(56) References Cited

U.S. PATENT DOCUMENTS

| | | | | |
|---|---|---|---|---|
| 3,632,305 A * | 1/1972 | Hardison | ............. | B01D 53/501 423/243.08 |
| 3,834,133 A * | 9/1974 | Bow | ........................ | F28B 3/04 261/36.1 |
| 3,944,401 A * | 3/1976 | Dorr | ..................... | B01D 47/10 95/224 |
| 4,019,444 A * | 4/1977 | Kleeberg | ................. | F23J 15/00 110/189 |
| 4,029,751 A * | 6/1977 | Dorr | ..................... | C01B 17/775 423/522 |
| 4,147,756 A * | 4/1979 | Dahlstrom | ............. | B01D 53/68 423/243.1 |
| 4,251,236 A * | 2/1981 | Fattinger | .................. | F23J 15/04 95/197 |
| 4,512,784 A * | 4/1985 | De Loach | ............. | C02F 1/5236 261/22 |
| 4,643,742 A * | 2/1987 | Hammarskog | ........ | B01D 47/10 95/225 |
| 4,999,167 A * | 3/1991 | Skelley | .................... | F23J 15/04 261/138 |
| 5,405,590 A * | 4/1995 | Macedo | ............... | B01D 53/501 422/618 |
| 6,019,818 A * | 2/2000 | Knapp | ................... | B01D 47/06 96/272 |
| 6,174,510 B1 * | 1/2001 | Riano | ..................... | C01B 17/76 95/137 |
| 6,523,811 B1 * | 2/2003 | Kumada | ............ | B01D 53/1456 261/130 |
| 6,841,138 B2 * | 1/2005 | Kumada | .................. | F23J 15/06 423/243.08 |
| 7,585,476 B2 * | 9/2009 | Downs | ................... | B01D 53/62 423/242.1 |
| 8,052,948 B2 * | 11/2011 | Iijima | ................ | B01D 53/1425 423/220 |
| 9,310,120 B2 * | 4/2016 | Cerdan | ................. | F25D 17/042 |
| 2001/0021362 A1 * | 9/2001 | Ishida | ............... | B01D 53/1412 423/228 |
| 2003/0045756 A1 * | 3/2003 | Mimura | ............ | B01D 53/1475 564/498 |
| 2005/0132883 A1 * | 6/2005 | Su | ........................... | C10K 3/04 423/220 |
| 2010/0083831 A1 * | 4/2010 | Gal | ........................ | B01D 53/62 95/232 |
| 2011/0135550 A1 * | 6/2011 | Nagayasu | .......... | B01D 53/1406 422/178 |
| 2014/0305190 A1 * | 10/2014 | Okamoto | ............... | G01N 21/61 73/23.31 |
| 2016/0114283 A1 * | 4/2016 | Okamoto | ............... | B01D 53/30 96/234 |
| 2016/0121260 A1 * | 5/2016 | Hirata | .................... | B01D 65/02 210/636 |

FOREIGN PATENT DOCUMENTS

| | | |
|---|---|---|
| JP | S47-38787 B1 | 9/1972 |
| JP | S59-160519 A | 9/1984 |
| JP | H7-246313 A | 9/1995 |
| JP | 2001-29741 A | 2/2001 |
| JP | 2005-87828 A | 4/2005 |
| JP | 2016-381 A | 1/2016 |
| JP | 2016-168574 A | 9/2016 |

OTHER PUBLICATIONS

International Search Report issued in corresponding International Application No. PCT/JP2018/039526, mailed Jan. 29, 2019 (2 pages).

Extended European Search Report in corresponding European Application No. 18873341.4, dated Jun. 16, 2021 (9 pages).

* cited by examiner

AIR POLLUTION CONTROL UNIT AND AIR POLLUTION CONTROL METHOD, AND CO2 RECOVERY UNIT AND CO2 RECOVERY METHOD

FIELD

The present invention relates to an air pollution control unit and an air pollution control method, and a $CO_2$ recovery unit and a $CO_2$ recovery method each for removing particles from a gas.

BACKGROUND

The greenhouse effect of $CO_2$ has been pointed out as one of the causes of global warming phenomena, and countermeasures thereto have recently become urgent worldwide to protect the global environment. $CO_2$ is generated from all kinds of human activity fields where fossil fuels are combusted, and there tend to be stronger calls for the regulation of carbon dioxide emissions. Such demands are directed to power generating facilities such as thermal power plants which use large amounts of fossil fuels, and have led to intense studies on methods in which flue gas exhausted from industrial facilities such as boilers and gas turbines are brought into contact with amine-based $CO_2$ absorbent, and thereby $CO_2$ is removed and recovered from the flue gas, and on air pollution control systems which store the recovered $CO_2$ without releasing it to the atmosphere.

Numerous $CO_2$ recovery units have been proposed which perform steps for removing and recovering $CO_2$ from a flue gas using $CO_2$ absorbent described above. Such steps include a step of bringing the flue gas and the $CO_2$ absorbent into contact with each other in a $CO_2$ absorber (hereinafter also simply referred to "absorber"), and a step of heating the $CO_2$ absorbent which has absorbed $CO_2$ in an absorbent regenerator (hereinafter also simply referred to as "regenerator") to release $CO_2$ and to regenerate the $CO_2$ absorbent, and circulating the $CO_2$ absorbent back to the $CO_2$ absorber for reuse.

In the absorber, the flue gas is brought into countercurrent contact with the $CO_2$ absorbent, for example, one including an absorption component such as alkanolamine, and $CO_2$ in the flue gas is absorbed into the $CO_2$ absorbent by chemical reaction (exothermic reaction) and the flue gas from which $CO_2$ is removed is released out of the system. The $CO_2$ absorbent which has absorbed $CO_2$ is also called a rich solution. The rich solution is pressurized with a pump, heated in a heat exchanger using the hot $CO_2$ absorbent (lean solution) regenerated by releasing $CO_2$ in the regenerator, and supplied to the regenerator.

Incidentally, because flue gas contains particles, an air pollution control unit is installed which performs pretreatments such as gas cleaning and gas cooling on the particle-containing gas before the $CO_2$ removal and recovery steps. An air pollution control unit of this type that has been proposed adopts a system in which a gas is treated by countercurrent gas-liquid contact in a packed section of a gas washing column (see, for example, Patent Literature 1). In another gas treating system that has been proposed, a gas is treated by co-current gas-liquid contact followed by countercurrent gas-liquid contact (see, for example, Patent Literature 2).

CITATION LIST

Patent Literature

Patent Literature 1: Japanese Patent Application Laid-open No. 2005-87828 A

Patent Literature 2: Japanese Patent Application Laid-open No. S59-160519 A

SUMMARY

Technical Problem

Unfortunately, the countercurrent gas-liquid contact system disclosed in Patent Literature 1 has a drawback in that the performance in collecting particles from a gas is not sufficiently enhanced. Furthermore, the system disclosed in Patent Literature 2 which involves co-current gas-liquid contact followed by countercurrent gas-liquid contact has a problem in that the co-current gas-liquid contact section receives a large supply of makeup water. Furthermore, if the particle collection efficiency at the gas washing column is low, for example, particles which are collected into a liquid downstream of the gas washing column become attached to the apparatus to cause fouling and clogging problems, and the particle-containing liquid scatters to the gas to cause adverse effects downstream of the air pollution control unit.

In light of the problems discussed above, an object of the present invention is to provide an air pollution control unit, an air pollution control method, a $CO_2$ recovery unit and a $CO_2$ recovery method which each allow particle-containing gas to be cleaned in a gas washing column with an enhanced particle collection performance.

Solution to Problem

To solve the above problem, a first invention according to the present invention is an air pollution control unit configured to bring particle-containing gas and washing liquid into contact with each other to collect particles in the particle-containing gas. The air pollution control unit includes a gas washing column having a gas cleaning section in which the particle-containing gas and the washing liquid are brought into co-current contact with each other, a gas cooling column which is disposed downstream of the gas washing column along a gas flow and in which the particle-containing gas that has been cleaned and cooling liquid are brought into countercurrent contact with each other, and a gas communication path through which the gas washing column and the gas cooling column are made to communicate with each other on a bottom side and through which the cleaned gas that has been cleaned in the gas washing column is introduced into the gas cooling column. The gas washing column includes a washing liquid reservoir section which is disposed downstream of the gas cleaning section along the gas flow and in which the washing liquid is dropped and reserved, a washing liquid circulation line through which the washing liquid from the washing liquid reservoir section is circulated to a top side of the gas washing column, and a sloped plate which is disposed at a connection opening of the gas communication path on the gas washing column side and regulates the gas flow. The gas cooling column includes a condensed water reservoir section in which condensed water that has been condensed from the cleaned gas is reserved, a condensed water circulation line through which the condensed water from the condensed water reservoir section is circulated to a gas cooling section, a cooling device which is interposed in the condensed water circulation line and cools the condensed water, a demister which is disposed downstream of the gas cooling section along the gas flow, and a condensed water transfer line through which the condensed water from the gas cooling column is transferred to the gas washing column.

A second invention is the air pollution control unit according to the first invention, in which the air pollution control unit comprises, at the washing liquid reservoir section, a liquid level meter which measures the amount of the washing liquid reserved.

A third invention is the air pollution control unit according to the first or second invention, in which the particle-containing gas contains sulfur oxide, and the air pollution control unit comprises a basic compound supply section which supplies a basic compound into the washing liquid.

A fourth invention is a $CO_2$ recovery unit including the air pollution control unit according to third invention, a gas exhausting line through which treated gas discharged from the gas cooling column is exhausted, a $CO_2$ absorber in which the cooled gas is introduced through the gas exhausting line, and $CO_2$ in cooled gas and $CO_2$ absorbent are brought into contact with each other, and thereby $CO_2$ is removed, a $CO_2$ absorbent regenerator in which a rich solution that has absorbed $CO_2$ is regenerated with steam from a reboiler, a rich solution supply line through which the rich solution is drawn from the $CO_2$ absorber and is introduced to the $CO_2$ absorbent regenerator, and a lean solution supply line through which a lean solution that has released $CO_2$ and has been regenerated in the $CO_2$ absorbent regenerator is drawn from the $CO_2$ absorbent regenerator and is introduced into the $CO_2$ absorber to be reused as the $CO_2$ absorbent.

A fifth invention is an air pollution control method configured to bring particle-containing gas and washing liquid into contact with each other and thereby to collect particles in the particle-containing gas. The air pollution control method includes a deducting step in which the particle-containing gas and the washing liquid are brought into co-current contact with each other in a gas washing column, and gas after gas cleaning flows down and collides with a fluid surface in a washing liquid reservoir section through a gas flow channel which is narrowed by a gas flow regulating plate, and thereby the gas is dedusted, a cooling step in which the cleaned gas resulting from the dedusting is cooled in a gas cooling column, and at the same time water in the cleaned gas is condensed with cooling water and thereby condensed water is obtained, and a washing liquid replenishing step in which the condensed water obtained is supplied to the gas washing column to replenish the washing liquid.

A sixth invention is the air pollution control method according to the fifth invention, in which the pressure loss in the gas washing column is controlled by controlling the liquid level in the washing liquid reservoir section.

A seventh invention is the air pollution control method according to the fifth or sixth invention, in which the particle-containing gas contains sulfur oxide, and a basic compound is supplied into the washing liquid to perform desulfurization.

An eighth invention is a $CO_2$ recovery method including a cleaning and desulfurization step in which particle-containing gas containing sulfur oxide and $CO_2$ is introduced into a gas washing column, a basic compound is supplied into washing liquid that is being circulated, and the particle-containing gas is dedusted and desulfurized, a cooling step in which the cleaned gas resulting from the dedusting and desulfurization is cooled in a gas cooling column, and at the same time water in the cleaned gas is condensed with cooling water and thereby condensed water is obtained, a washing liquid replenishing step in which the condensed water obtained is supplied to the gas washing column to replenish the washing liquid, a $CO_2$ absorbing step in which treated gas resulting from the gas cooling is introduced into a $CO_2$ absorber, and $CO_2$ in the cooled gas and $CO_2$ absorbent are brought into contact with each other, and thereby $CO_2$ is removed, a $CO_2$ absorbent regeneration step in which a rich solution that has absorbed $CO_2$ is introduced into a $CO_2$ absorbent regenerator and is regenerated with reboiler steam, and a step in which the $CO_2$ absorbent is circulated for reuse between the $CO_2$ absorber and the $CO_2$ absorbent regenerator through circulation lines.

Advantageous Effects of Invention

According to the present invention, a gas washing column and a gas cooling column are made to communicate with each other through a gas communication path provided with a sloped plate. The sloped plate is disposed at a connection opening on the gas washing column side to regulate the flow of gas, so that efficiency of collision of cleaned gas and a fluid bath at the time of entry of the cleaned gas into the communication path can be increased. Furthermore, a condensed water transfer line is provided through which condensed water recovered at the gas cooling column is transferred to the gas washing column, and the condensed water from the gas cooling column is introduced into the gas washing column, thereby making it possible to eliminate the need to supply makeup water to the gas washing column or to reduce the amount of makeup water that is required.

DESCRIPTION OF EMBODIMENTS

Preferred embodiments of the present invention will be described in detail with reference to the accompanying drawings. The scope of the present invention is not limited by these embodiments and, where a plurality of embodiments are presented, includes combinations of such embodiments.

First Embodiment

Figure 1:
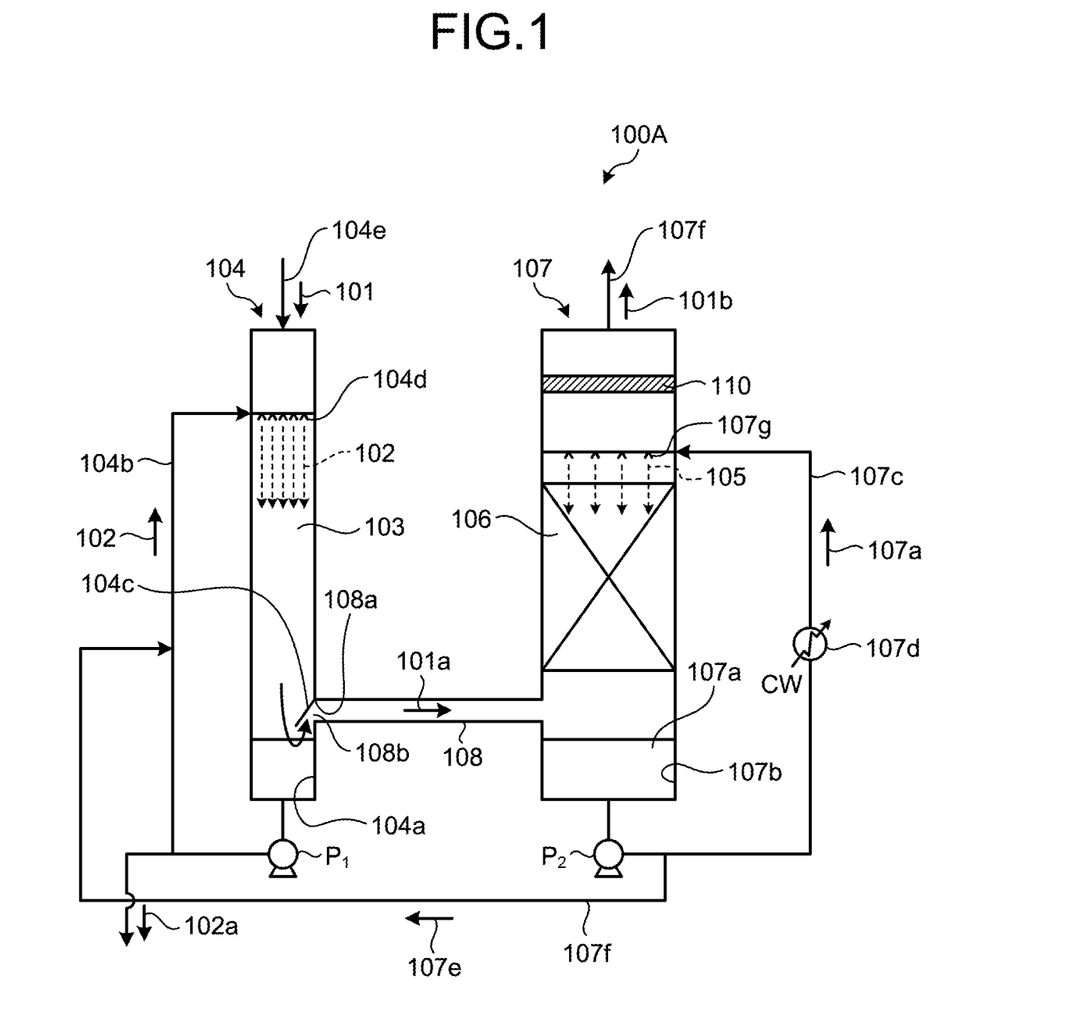
FIG. 1 is a schematic view of an air pollution control unit according to a first embodiment.

FIG. 1 is a schematic view of an air pollution control unit according to a first embodiment.

As illustrated in FIG. 1, the air pollution control unit 100A according to the first embodiment is an air pollution control unit configured to bring particle-containing gas 101 and washing liquid 102 into contact with each other to collect particles in the particle-containing gas 101, and the air pollution control unit 100A includes: a gas washing column 104 having a gas cleaning section 103 in which the particle-containing gas 101 and the washing liquid 102 are brought into co-current contact with each other; a gas cooling column 107 disposed downstream of the gas washing column 104 along the gas flow and having a gas cooling section 106 in which the particle-containing gas 101a that has been cleaned (cleaned gas) and cooling liquid 105 are brought into countercurrent contact with each other; and a gas communication path 108 through which the gas washing column 104 and the gas cooling column 107 are made to communicate with each other on a bottom side and through which the cleaned gas 101a that has been cleaned in the gas washing column 104 is introduced into the gas cooling column 107.

The gas washing column 104 has a top portion from which the particle-containing gas 101 is introduced thereinto through a gas introduction line 104e, so as to make gas flows having a high flow velocities toward the bottom portion of the gas washing column 104.

Furthermore, the gas washing column 104 has: a washing liquid reservoir section 104a which is disposed downstream of the gas cleaning section 103 along the gas flow and in which the washing liquid 102 is dropped and reserved; a washing liquid circulation line 104b through which the washing liquid 102 from the washing liquid reservoir section 104a is circulated to a top side of the gas washing column 104; and a sloped plate 104c which is disposed at a connection opening 108a of the gas communication path 108 on the gas washing column 104 side and regulates the gas flow.

On the distal end side of the washing liquid circulation line 104b, a nozzle 104d for spraying the washing liquid 102 that is being circulated is disposed and drops the washing liquid 102 toward the washing liquid reservoir section 104a. The washing liquid circulation line 104b is provided with a fluid circulating pump $P_1$ which draws the washing liquid 102 from the washing liquid reservoir section 104a and circulates the washing liquid 102 to the nozzle 104d. The excess of the washing liquid 102 is discharged outside as excess fluid 102a.

The particle-containing gas 101 introduced is brought into co-current gas-liquid contact with the washing liquid 102, and thereby particles are removed, and thus the flow velocity of the gas flowing down in the column can be higher than a countercurrent gas-liquid contact system. It is Preferable that the gas flow velocity be, for example, about 10 to 20 m/s.

As a result, the particle-containing gas 101 has a relatively high flow velocity (for example, gas flow velocity of about 10 m/s to 20 m/s), and thereby the gas is allowed to collide intensively with the vicinity of the surface of the fluid bath in the washing liquid reservoir section 104a. Thus, enhancements are attained in the performance in collecting the particles in the particle-containing gas 101 into the pool of the washing liquid 102.

At the connection opening 108a of the gas communication path 108 on the gas washing column 104 side, the sloped plate 104c is disposed on the top edge of the connection opening 108a and inclines at a predetermined angle to form an open path 108b. The sloped plate 104c is disposed to extend from an inner corner portion of the sidewall of the gas washing column 104 to form the open path 108b, and thus regulates the gas flow of the cleaned gas 101a passing by the inner corner portion of the sidewall of the gas washing column 104.

Figure 2A:
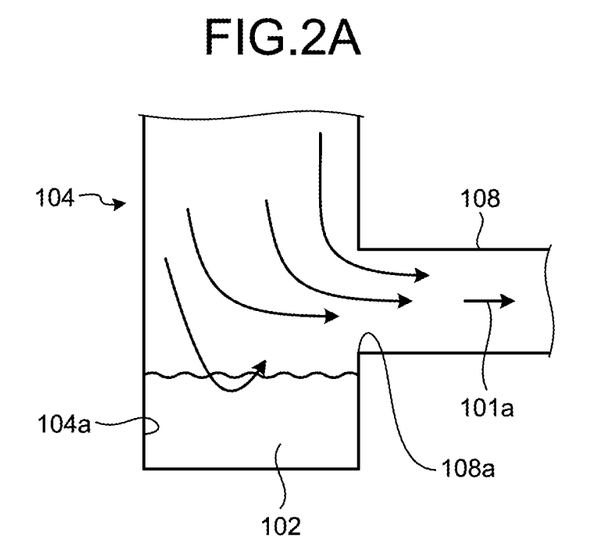
FIG. 2A is a detailed schematic view of a gas washing column according to conventional art.
Figure 2B:
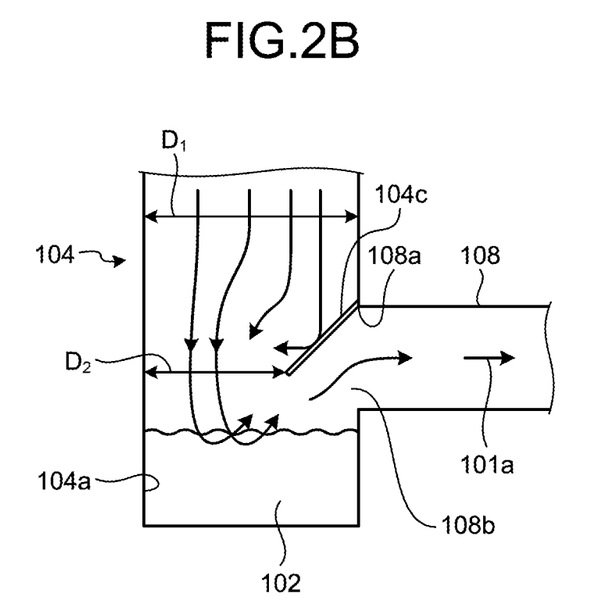
FIG. 2B is a detailed schematic view of a gas washing column according to the first embodiment.

FIG. 2A is a detailed schematic view of a gas washing column according to the conventional art. FIG. 2B is a detailed schematic view of the gas washing column according to the first embodiment. In the conventional art illustrated in FIG. 2A, no sloped plate is provided at a connection opening 108a of a gas communication path 108 on the gas washing column 104 side. In this case, cleaned gas 101a simply passes by the inner corner portion without being regulated, and thus has less chances of collision with a washing liquid reservoir section 104a. Consequently, most of the particles flow directly into the gas communication path 108 without being removed by the pool of the washing liquid 102.

In contrast, as illustrated in FIG. 2B, when the sloped plate 104c is provided at the connection opening 108a of the gas communication path 108 on the gas washing column 104 side, the cleaned gas 101a passing by the inner corner portion first collides with the top surface of the sloped plate 104c and is guided to the fluid surface in the washing liquid reservoir section 104a to collide intensively with the fluid surface. Thus, enhancements are attained in the performance in collecting the particles in the particle-containing gas 101 into the fluid bath.

Furthermore, the installation of the sloped plate 104c narrows the flow channel (D1>D2) passing through the bottom portion of the gas washing column 104, and thereby the cleaned gas 101a gains a further increase in gas flow velocity, so that collision efficiency of the cleaned gas 101a and the fluid surface in the washing liquid reservoir section 104a can be increased.

As discussed above, the installation of the sloped plate 104c allows the cleaned gas 101a to be introduced to the gas cooling column 107 so that the cleaned gas 101a collides directly with the fluid surface in the washing liquid reservoir section 104a, thus making it possible to increase the particle removal efficiency at the fluid surface.

Here, the pressure loss in the gas washing column 104 which removes the particle-containing gas 101 is preferably in the range of 1,000 to 3,000 Pa.

Furthermore, in the gas washing column 104, a throat portion narrowing the gas flow channel may be formed above a part where the sloped plate 104c is disposed, thereby further increasing the flow velocity of the cleaned gas 101a and efficiency of collision of the cleaned gas 101a and the fluid surface in the washing liquid reservoir section 104a.

Furthermore, the gas cooling column 107 has: a condensed water reservoir section 107b in which condensed water 107a that has been condensed from the cleaned gas 101a is reserved; a condensed water circulation line 107c through which the condensed water 107a from the condensed water reservoir section 107b is circulated as the cooling liquid 105 to the gas cooling section 106; a cooling device 107d which is interposed in the condensed water circulation line 107c and cools the condensed water 107a; a demister 110 which is disposed downstream of the gas cooling section 106 along the gas flow; and a condensed water transfer line 107f through which a condensed water discharge 107e from the gas cooling column 107 is transferred to the gas washing column 104.

The gas cooling column 107 is configured to cool the cleaned gas 101a with cooling water CW that is circulated, and the cooling liquid 105 is obtained with the cooling device 107d interposed in the condensed water circulation line 107c through which the condensed water 107a from the cleaned gas 101a is circulated.

The condensed water circulation line 107c is provided with a nozzle 107g which sprays the cooling liquid 105 being circulated and drops the cooling liquid 105 toward the condensed water reservoir section 107b, and thereby the water contained in the cleaned gas 101a is condensed. The condensed water circulation line 107c is provided with a fluid circulating pump $P_2$ which circulates the cooling liquid 105.

Furthermore, the gas cooling column 107 has a condensed water transfer line 107f through which the condensed water 107a formed in the column is transferred to the gas washing column 104.

As discussed above, the gas cooling column 107 is configured to recover water contained in the cleaned gas 101a as the condensed water 107a in the column, and to transfer the condensed water 107a that has been recovered, as the condensed water discharge 107e to the gas washing column 104 through the condensed water transfer line 107f. Thus, the condensed water discharge 107e can be introduced as makeup water for the washing liquid used in the gas washing column. As a result, it becomes possible to eliminate the need to supply makeup water to the gas washing column 104 or to reduce the amount of makeup water that is required.

Furthermore, it is preferable that the demister 110 disposed in the gas cooling column 107 to collect microparticles remaining in the gas have a pressure loss in the range of 500 to 2,500 Pa. Furthermore, the demister 110 may include a glass fiber layer.

An air pollution control method according to the present first embodiment is an air pollution control method configured to bring particle-containing gas 101 and washing liquid 102 into contact with each other and thereby to collect particles in the particle-containing gas 101, and the air pollution control method includes: a dedusting step in which the particle-containing gas 101 and the washing liquid 102 are brought into co-current contact with each other in the gas washing column 104, and the cleaned gas 101a flows down and collides with the fluid surface in the washing liquid reservoir section 104a through a gas flow channel which is narrowed by the sloped plate 104c that is a gas flow regulating plate, and thereby the gas is dedusted; a cooling step in which the cleaned gas 101a having been dedusted is cooled in the gas cooling column 107, and at the same time water in the cleaned gas 101a is condensed with the cooling liquid 105 and thereby condensed water 107a is obtained; and a washing liquid replenishing step in which the condensed water 107a obtained is supplied as a condensed water discharge 107e to the gas washing column 104 to replenish the washing liquid 102.

With this air pollution control method, the gas washing column 104 and the gas cooling column 107 communicate with each other through the gas communication path 108, and the sloped plate 104c which regulates the flow of gas is provided at the connection opening 108a of the gas communication path 108 on the gas washing column 104 side, so that efficiency of collision of the cleaned gas 101a and the fluid bath at the time of entry of the cleaned gas 101a into the gas communication path 108 can be increased. Furthermore, the condensed water 107a recovered in the gas cooling column 107 is transferred as the condensed water discharge 107e to the gas washing column 104. Thus, the method makes it possible to eliminate the need to supply makeup water to the gas washing column 104 or to reduce the amount of makeup water that is required.

Second Embodiment

Figure 3:
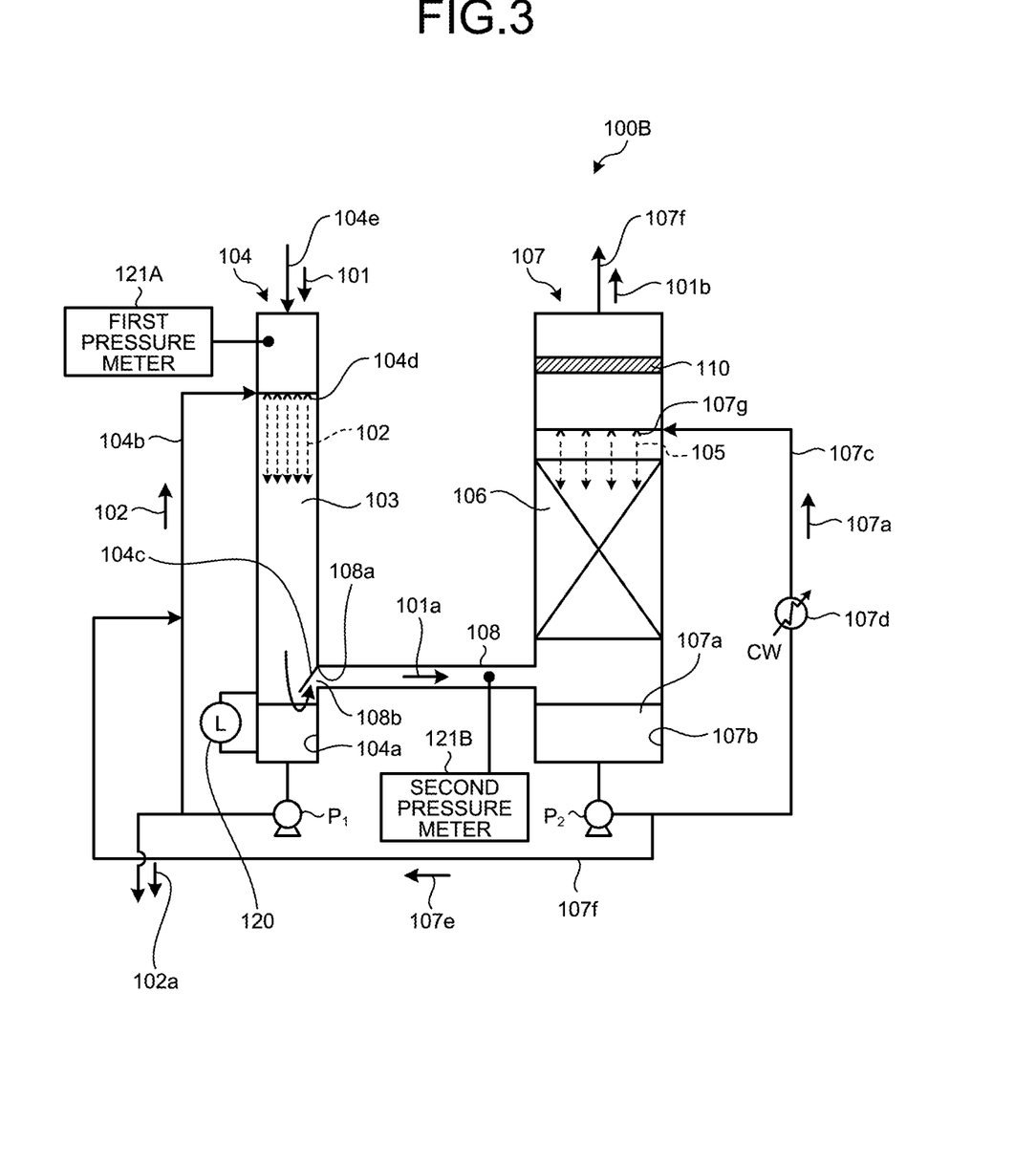
FIG. 3 is a schematic view of an air pollution control unit according to a second embodiment.

FIG. 3 is a schematic view of an air pollution control unit according to a second embodiment. The same reference numerals will be used for the same features as in the first embodiment, and overlaps will be omitted in the description of such features. As illustrated in FIG. 3, the air pollution control unit 100E according to the second embodiment includes: a liquid level meter 120 which controls the liquid level in the washing liquid reservoir section 104a; a first pressure meter 121A which measures the pressure at an introduction section of the gas washing column 104; and a second pressure meter 121B which measures the pressure in the gas communication path 108.

In the gas washing column 104, the liquid level meter 120 is disposed to respond to any change in the gas flow velocity of the particle-containing gas 101 that is being introduced into the gas washing column 104. When a change in the gas volume of the particle-containing gas 101 introduced is detected by the measurement with the first pressure meter 121A and the second pressure meter 121B, the liquid level meter 120 controls the liquid level in the washing liquid reservoir section 104a to control the pressure loss in the gas washing column 104.

Specifically, when the pressure loss decreases, the liquid level meter 120 is controlled to raise the liquid level of the liquid level meter 120, thus increasing the flow velocity of the gas passing through the open path 108b.

As a result, the pressure loss in the gas washing column 104 can be maintained substantially constant in despite of the presence of a change in the gas flow velocity of the particle-containing gas 101, and the particle collection performance in the gas washing column 104 can be maintained.

Third Embodiment

Figure 4:
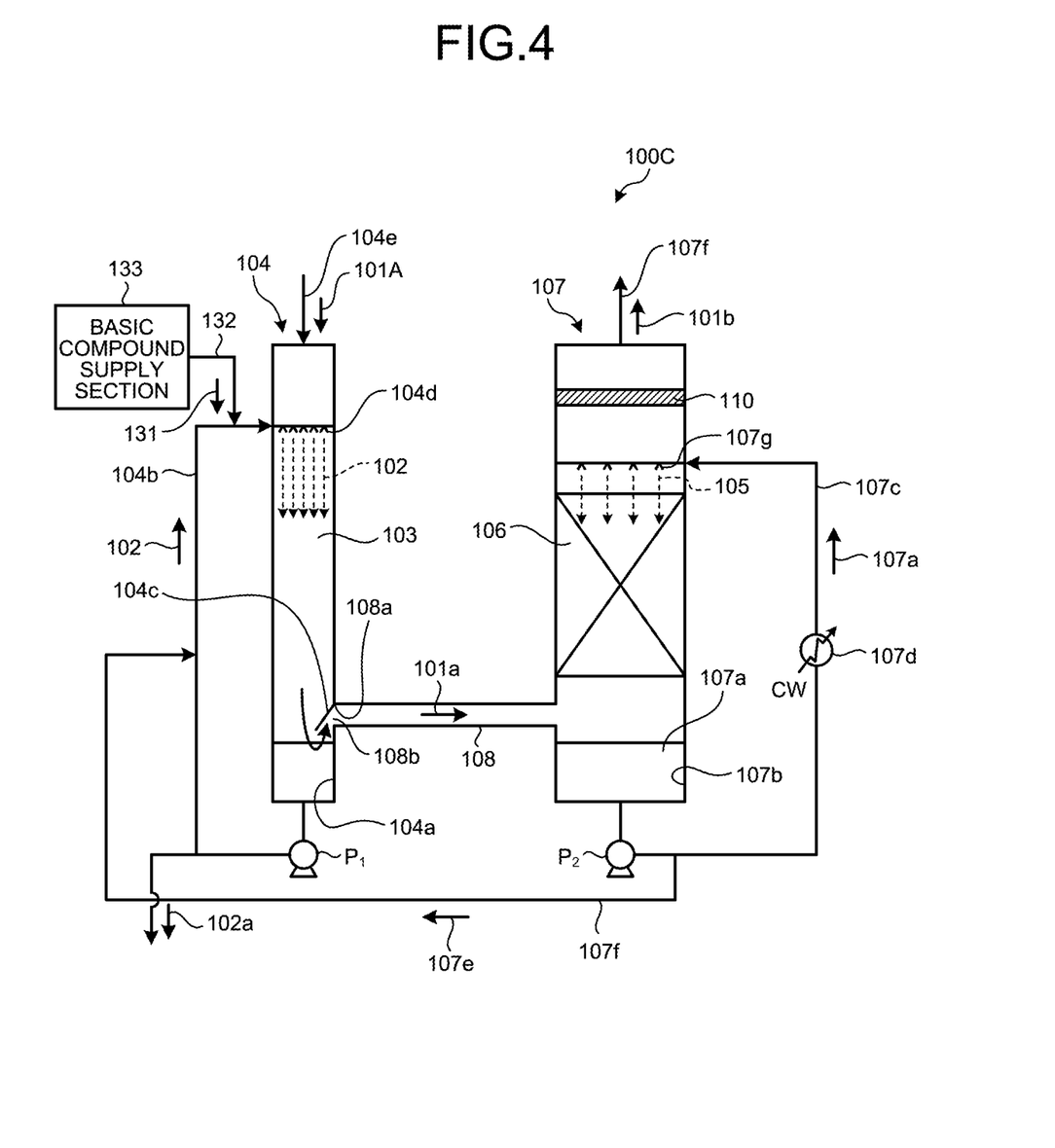
FIG. 4 is a schematic view of an air pollution control unit according to a third embodiment.

FIG. 4 is a schematic view of an air pollution control unit according to a third embodiment. The same reference numerals will be used for the same features as in the first embodiment, and overlaps will be omitted in the description of such features. As illustrated in FIG. 3, the air pollution control unit 1000 according to the third embodiment is designed to cope with cases where the gas introduced into the gas washing column 104 contains sulfur oxide in addition to particles.

In the third embodiment, gas 101A containing particles and sulfur oxide is introduced into the gas washing column 104 through the gas introduction line 104e. Furthermore, a basic compound supply section 133 is disposed on the washing liquid circulation line 104b, and a basic compound (for example, NaOH, $Na_2CO_3$, $Ca(OH)_2$, or $CaCO_3$) 131 is supplied therefrom through a supply line 132.

The basic compound 131 is mixed into the washing liquid 102, and the nozzle 104d sprays the liquid of the mixture. The mist sprayed from the nozzle 104d performs both dedusting and desulfurization during gas cleaning.

The above configuration allows for simultaneous dedusting and desulfurization in the gas washing column 104, and thus eliminates the need to install a separate sulfur oxide removing device.

Fourth Embodiment

Figure 5:
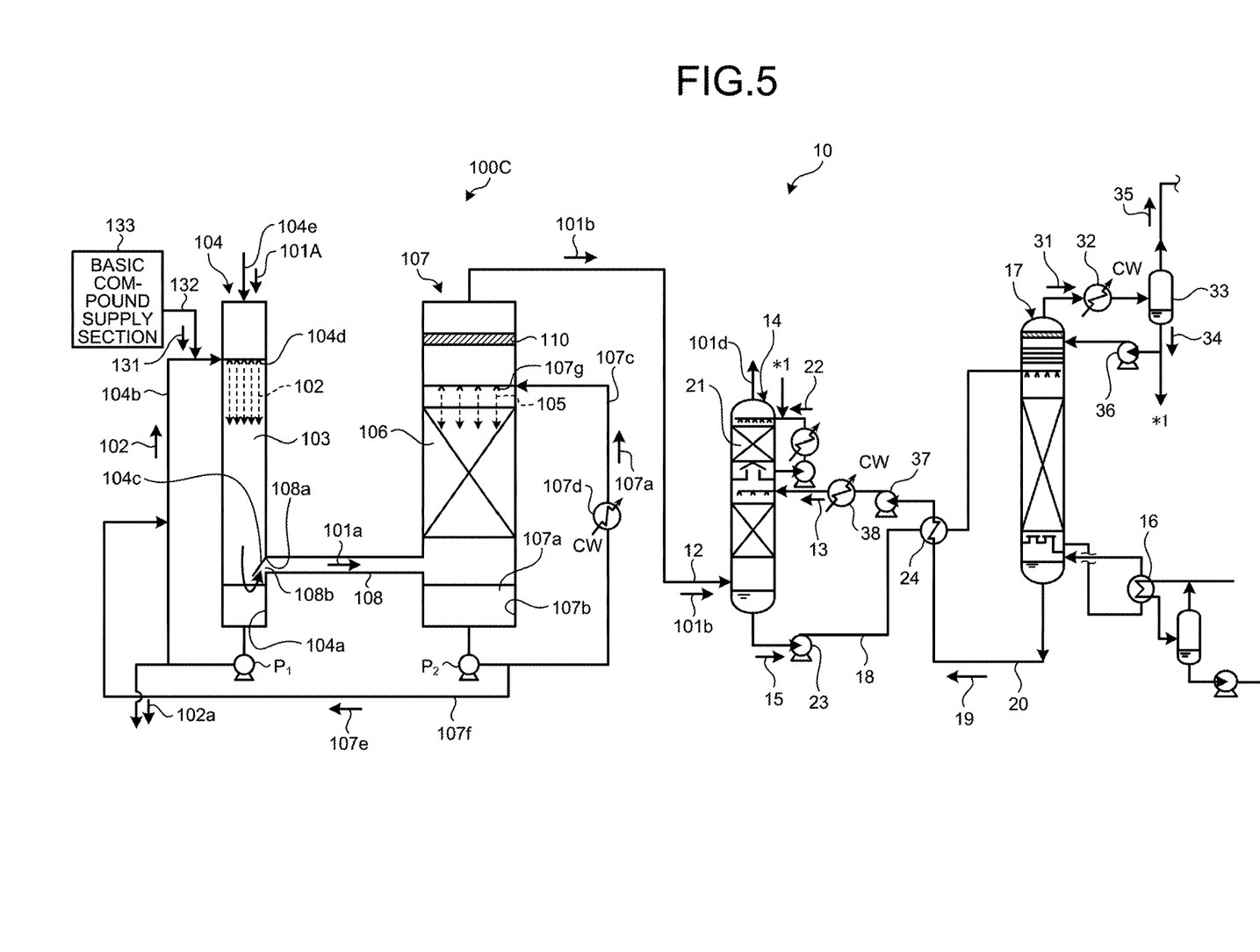
FIG. 5 is a schematic view of a $CO_2$ recovery unit including an air pollution control unit according to a fourth embodiment.

FIG. 5 is a schematic view of a $CO_2$ recovery unit including an air pollution control unit according to a fourth embodiment. The same reference numerals will be used for the same features as in the first embodiment, and overlaps will be omitted in the description of such features. The $CO_2$ recovery unit 10 of the fourth embodiment includes: the air pollution control unit 100C of the third embodiment into which gas 101A containing particles and sulfur oxide is introduced; a gas exhausting line 12 through which treated gas 101b discharged from the gas cooling column 107 is exhausted; a $CO_2$ absorber 14 in which the cooled gas is introduced through the gas exhausting line 12 and $CO_2$ in the cooled gas and $CO_2$ absorbent (lean solution) 13 are brought into contact with each other, and thereby $CO_2$ is removed; an absorbent regenerator 17 in which the $CO_2$ absorbent that has absorbed $CO_2$ (rich solution) 15 is regenerated with steam from a reboiler 16; a rich solution supply line 18 through which the rich solution 15 is drawn from the $CO_2$ absorber 14 and is introduced to the absorbent regenerator 17; and a lean solution supply line 20 through which the $CO_2$ absorbent (lean solution) 19 regenerated by releasing $CO_2$ in the absorbent regenerator 17 is drawn from the absorbent regenerator 17 and the $CO_2$ absorbent 19 is introduced into the $CO_2$ absorber 14 to be reused as the $CO_2$ absorbent.

In a $CO_2$ recovery method using the $CO_2$ recovery unit 10, first, gas 101A which contains particles, particles containing $CO_2$, and sulfur oxide is fed to the gas washing column 104 in the air pollution control unit 100C and is cleaned and dedusted with the washing liquid 102. The cleaned gas 101a is introduced through the gas communication path 108 into the gas cooling column 107, cooled with the cooling liquid 105, and fed as the treated gas 101b to the $CO_2$ absorber 14 through the gas exhausting line 12.

In the $CO_2$ absorber 14, the treated gas 101b is brought into countercurrent contact with the $CO_2$ absorbent 13 according to the fourth embodiment that is amine-based absorbent, and $CO_2$ in the treated gas 101b is absorbed in the $CO_2$ absorbent 13 by chemical reaction. $CO_2$-free flue gas 101d from which $CO_2$ has been removed in the $CO_2$ absorber 14 is brought into gas-liquid contact with cleaning water 22 supplied from a nozzle in a washing section 21 in the $CO_2$ absorber 14, the cleaning water being circulated and containing the $CO_2$ absorbent 13, and the $CO_2$ absorption component entrained with the $CO_2$-free flue gas 101d is recovered, the gas being then emitted from the column top out of the system. Furthermore, the rich solution 15 that has absorbed $CO_2$ is pressurized with a rich solution pump 23, heated in a rich-lean solution heat exchanger 24 using the lean solution 19 regenerated in the absorbent regenerator 17, and supplied to the absorbent regenerator 17.

The rich solution 15 emitted from a top portion of the absorbent regenerator 17 into the absorbent regenerator 17 is caused to undergo endothermic reaction by water vapor from the reboiler 16 that is supplied through a bottom portion of the absorbent regenerator 17, and releases most of the absorbed CO2. The CO2 absorbent that has released part or most of the absorbed CO2 in the absorbent regenerator 17 is called a semi-lean solution. The semi-lean solution is regenerated to the CO2 absorbent (lean solution) 19 from which substantially all CO2 has been completely removed by the time the CO2 absorbent reaches the bottom portion of the absorbent regenerator 17. Part of the lean solution 19 is heated with the reboiler 16 and supplies water vapor to the inside of the absorbent regenerator 17.

On the other hand, CO2-containing gas 31 released from the rich solution 15 and the semi-lean solution in the regenerator is led out through the top portion of the absorbent regenerator 17 together with the water vapor, the water vapor being condensed with a condenser 32, and the condensed water 34 and the CO2 gas 35 are separated from each other in a separation drum 33. The CO2 gas 35 separated is passed through a separation drum which is not illustrated, and is thereafter injected into oilfields using enhanced oil recovery (EOR) or is reserved into aquifers to address global warming. The condensed water 34, which has been separated from the CO2-containing gas 31 entraining water vapor and been refluxed at the separation drum 33, is supplied to the top portion of the absorbent regenerator 17 by a reflux water circulation pump 36 and is also added to the cleaning water 22 to be supplied to the absorber 14. The regenerated CO2 absorbent (lean solution) 19 is cooled in the rich-lean solution heat exchanger 24 using the rich solution 15, subsequently pressurized with a lean solution pump 37, further cooled in a lean solution cooler 38, and thereafter supplied into the CO2 absorber 14. The description of the embodiment is only illustrative of the overview of the embodiment, and omits some of the accompanying devices.

In the fourth embodiment, dedusting and desulfurization can be performed simultaneously in the gas washing column 104. Furthermore, because the treated gas 101b that has been cooled in the gas cooling column 107 and flows into the $CO_2$ absorber 14 contains a reduced amount of particles, an accumulation rate of collected particles in the $CO_2$ absorbent 13 used in the $CO_2$ absorber 14 (the $CO_2$ absorbent 13 is circulated and is used repeatedly while absorbing and releasing $CO_2$) is reduced. As a result, the $CO_2$ recovery unit 10 can prevent problems, such as fouling and clogging, caused by particles attached to the equipment.

In the fourth embodiment, the gas that flows into the $CO_2$ absorber 14 contains a reduced amount of particles, and thus the emission of $CO_2$ absorbent components, being absorbed in water attached around the particles, that are entrained with the outlet gas from the $CO_2$ absorber 14 is reduced.

The fourth embodiment that involves the air pollution control unit 100C illustrated in FIG. 4 may further include the liquid level meter 120 of the second embodiment to cope with changes in gas flow velocity.

A $CO_2$ recovery method according to the fourth embodiment includes: a cleaning and desulfurization step in which particle-containing gas 101 containing sulfur oxide and $CO_2$ is introduced into the gas washing column 104, a basic compound 131 is supplied into the washing liquid 102 that is being circulated, and the particle-containing gas 101 is dedusted and desulfurized; a cooling step in which the cleaned gas 101a resulting from the dedusting and desulfurization is cooled in the gas cooling column 107, and at the same time water in the cleaned gas 101a is condensed with cooling liquid 105 and thereby condensed water 107a is obtained; a washing liquid replenishing step in which the condensed water 107a obtained is supplied to the gas washing column 104 to replenish the washing liquid 102; a $CO_2$ absorbing step in which the treated gas resulting from the gas cooling is introduced into the $CO_2$ absorber 14, and $CO_2$ in the cooled gas and $CO_2$ absorbent 13 are brought into contact with each other, and thereby $CO_2$ is removed; a $CO_2$ absorbent regeneration step in which the rich solution 15 that has absorbed $CO_2$ is regenerated with steam from the reboiler; and a step in which the $CO_2$ absorbent is circulated for reuse between the $CO_2$ absorber 14 and the absorbent regenerator 17 through circulation lines.

With this $CO_2$ recovery method, dedusting and desulfurization can be performed simultaneously in the gas washing column 104.

Furthermore, because the treated gas 101b that has been cooled in the gas cooling column 107 and flows into the $CO_2$ absorber 14 contains a reduced amount of particles, an accumulation rate of collected particles in the $CO_2$ absorbent 13 used in the $CO_2$ absorber 14 is reduced. As a result, the $CO_2$ recovery unit 10 can prevent problems, such as fouling and clogging, caused by particles attached to the equipment.

REFERENCE SIGNS LIST

10 $CO_2$ RECOVERY UNIT
12 GAS EXHAUSTING LINE
13 $CO_2$ ABSORBENT (LEAN SOLUTION)

14 CO$_2$ ABSORBER
15 CO$_2$ ABSORBENT (RICH SOLUTION)
16 REBOILER
17 ABSORBENT REGENERATOR
18 RICH SOLUTION SUPPLY LINE
19 CO$_2$ ABSORBENT (LEAN SOLUTION)
20 LEAN SOLUTION SUPPLY LINE
100A-100C AIR POLLUTION CONTROL UNITS
101 PARTICLE-CONTAINING GAS
101A GAS CONTAINING PARTICLES AND SULFUR OXIDE
102 WASHING LIQUID
103 GAS CLEANING SECTION
104 GAS WASHING COLUMN
105 COOLING LIQUID
106 GAS COOLING SECTION
107 GAS COOLING COLUMN
108 GAS COMMUNICATION PATH

The invention claimed is:

1. An air pollution control unit configured to bring particle-containing gas and washing liquid into contact with each other to collect particles in the particle-containing gas, the air pollution control unit comprising:
   a gas washing column having a gas cleaning section in which the particle-containing gas and the washing liquid are brought into co-current contact with each other;
   a gas cooling column which is disposed downstream of the gas washing column along a gas flow and in which the particle-containing gas that has been cleaned and cooling liquid are brought into countercurrent contact with each other; and
   a gas communication path through which the gas washing column and the gas cooling column are made to communicate with each other on a bottom side and through which the cleaned gas that has been cleaned in the gas washing column is introduced into the gas cooling column, wherein
   the gas washing column comprises:
      a washing liquid reservoir section which is disposed on a bottom of the gas cleaning section along the gas flow and in which the washing liquid is dropped and reserved;
      a washing liquid circulation line through which the washing liquid from the washing liquid reservoir section is circulated to a top side of the gas washing column;
      a connection opening on a sidewall of the gas washing column, wherein the connection opening is an inlet of the gas communication path;
      a sloped plate that extends straight downward from a top edge of the connection opening toward a fluid surface of the washing liquid reserved in the washing liquid reservoir section and toward an inside of the washing liquid reservoir section, wherein the sloped plate regulates the gas flow flowing through the connection opening;
      an open path between the sloped plate and the fluid surface, wherein the open path causes the particle-containing gas to flow into the gas communication path; and
      a liquid level meter that measures an amount of the washing liquid reserved at the washing liquid reservoir section,
      a tip of the sloped plate is a free end, and
   the air pollution control unit controls a liquid level in the washing liquid reservoir section in response to a change in a gas volume of the particle-containing gas introduced to the gas washing column.

2. The air pollution control unit according to claim 1, wherein the particle-containing gas contains sulfur oxide, and the air pollution control unit comprises a basic compound supply section which supplies a basic compound into the washing liquid.

3. A CO2 recovery unit comprising:
   the air pollution control unit according to claim 2,
   a gas exhausting line through which treated gas discharged from the gas cooling column is exhausted,
   a CO2 absorber in which the cooled gas is introduced through the gas exhausting line, and CO2 in the cooled gas and CO2 absorbent are brought into contact with each other, and thereby CO2 is removed,
   a CO2 absorbent regenerator in which a rich solution that has absorbed CO2 is regenerated with steam from a reboiler,
   a rich solution supply line through which the rich solution is drawn from the CO2 absorber and is introduced to the CO2 absorbent regenerator, and
   a lean solution supply line through which a lean solution that has released CO2 and has been regenerated in the CO2 absorbent regenerator is drawn from the CO2 absorbent regenerator and is introduced into the CO2 absorber to be reused as the CO2 absorbent.

4. The air pollution control unit according to claim 1, wherein
   the gas cooling column comprises:
      a condensed water reservoir section in which condensed water that has been condensed from the cleaned gas is reserved;
      a condensed water circulation line through which the condensed water from the condensed water reservoir section is circulated to a gas cooling section;
      a cooling device that is interposed in the condensed water circulation line and cools the condensed water;
      a demister disposed downstream of the gas cooling section along the gas flow; and
      a condensed water transfer line through which the condensed water from the gas cooling column is transferred to the gas washing column.

5. The air pollution control unit according to claim 1, further comprising:
   a first pressure meter that measures a pressure at an introduction section of the gas washing column; and
   a second pressure meter that measures a pressure in the gas communication path, wherein
   the change of the gas volume of the particle-containing gas is detected by the first pressure meter and the second pressure meter, and
   a pressure loss in the gas washing column is controlled by control of the liquid level in the washing liquid reservoir section.

* * * * *